Figure 1:
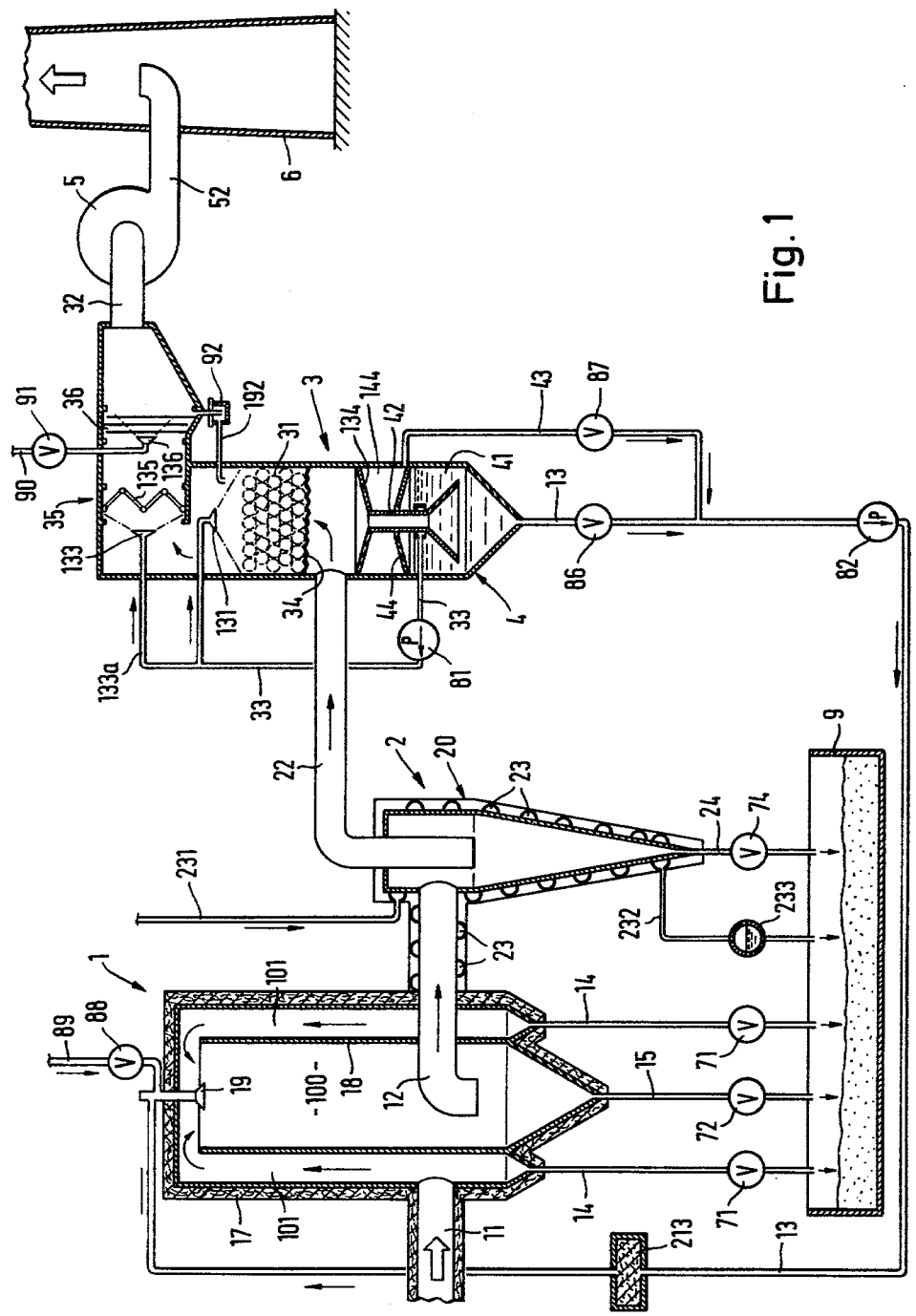

United States Patent [19]

Fattinger et al.

[11] 4,251,236
[45] Feb. 17, 1981

[54] PROCESS FOR PURIFYING THE OFF-GASES FROM INDUSTRIAL FURNACES, ESPECIALLY FROM WASTE INCINERATION PLANTS

[75] Inventors: Volker Fattinger, Arlesheim; Jürg Schneider, Muttenz, both of Switzerland

[73] Assignee: Ciba-Geigy Corporation, Ardsley, N.Y.

[21] Appl. No.: 960,502

[22] Filed: Nov. 13, 1978

[30] Foreign Application Priority Data

Nov. 17, 1977 [CH] Switzerland ............... 14060/77
Oct. 20, 1978 [CH] Switzerland ............... 10877/78

[51] Int. Cl.³ .......................................... B01D 47/00
[52] U.S. Cl. ........................................ 55/84; 55/89;
55/222; 55/229; 55/238; 55/257 C; 55/85
[58] Field of Search ............... 55/84, 89, 85, 229,
55/257 C, 222, 238; 422/168, 169, 173

[56] References Cited

U.S. PATENT DOCUMENTS

| | | | |
|---|---|---|---|
| 3,203,156 | 8/1965 | McGregor et al. | 55/229 |
| 3,520,662 | 7/1970 | Marks | 422/169 |
| 3,929,968 | 12/1975 | Teob | 423/242 |
| 4,013,455 | 3/1977 | Kleeberg et al. | 55/84 |
| 4,019,444 | 4/1977 | Kleeberg et al. | 55/84 |
| 4,147,756 | 4/1979 | Dahlstrom | 55/85 |

FOREIGN PATENT DOCUMENTS

2746975 4/1978 Fed. Rep. of Germany .
2338069 12/1977 France .
719757 12/1954 United Kingdom .

*Primary Examiner*—Norman Yudkoff
*Attorney, Agent, or Firm*—Harry Falber

[57] ABSTRACT

A process for purifying the off-gases from industrial furnaces and especially from waste incineration plants is described in which process the off-gases which contain acid, neutral and/or basic pollutants in the gaseous or solid form or in the form of a mist, are treated in an evaporative cooler and then in a dry purifier, in which they are freed from at least a substantial portion of the solid pollutants, and finally in a scrubber by means of a wash liquid. The temperature of the off-gases in the evaporative cooler is kept above the dew point, and the wash liquid in the scrubber is cycled through a slurry separator, from which suspension or solution of pollutants is withdrawn from the sludge separator and fed into the evaporative cooler and mixed in a mixing space in the latter with the hot off-gases. Those walls of the evaporative cooler which come into contact with the mixture of off-gases and recycled suspension or solution of pollutants and which consist of a material that can be corroded by the said mixture at room temperature are heated from the outside to a temperature above the dew point.

As a rule the pH value of the liquid phase in the sludge separator and in each of the gas wash stages of the scrubber directly upstream of the said separator is kept below 4.

25 Claims, 6 Drawing Figures

PROCESS FOR PURIFYING THE OFF-GASES FROM INDUSTRIAL FURNACES, ESPECIALLY FROM WASTE INCINERATION PLANTS

The invention relates to a process for purifying the off-gases from industrial furnaces, especially from waste incineration plants, in which process the off-gases, which can contain acid, neutral and basic harmful substances (pollutants) in the gaseous or solid form or in the form of a mist, are treated, preferably after prior withdrawal of thermal energy, in an evaporative cooler and then in a dry pollutants-separator (dry purifier, dry collector) in which they are freed from at least a substantial portion of the solid harmful substances (pollutants), where upon they are treated in a scrubber by means of a wash liquid, the temperature of the off-gases in the evaporative cooler being kept above the dew point and the wash liquid in the scrubber being cycled through a sludge separator (thickener), from which pollutants suspension is withdrawn, and the pollutants suspension is fed from the sludge separator via a return line to the evaporative cooler and mixed, preferably in a mixing space in the latter, with the hot off-gases.

Preferably, the thermal energy is withdrawn from the off-gases in an indirect heat exchanger, in particular a steam generator being indirectly heated by the off-gases, before these enter the evaporative cooler.

A plant of the above type for carrying out the purification of off-gases from industrial furnaces for the treatment of non-ferrous metal melts, especially aluminium melts, is described in German Auslegeschrift 2,408,222 of Gottfried Bischoff Bau kompl. Gasreinigungs- und Wasserrückkühlanlagen KG, Essen, Germany.

Whilst off-gases from aluminium melts and similar non-ferrous metal melts do indeed contain small amounts of hydrogen fluoride and hydrogen chloride sufficient to produce in the scrubber effluents having a pH value of over 4 and frequently over 6.5, the off-gases from waste incineration plants have, in contrast thereto a much higher content of hydrogen chloride, stemming in particular from the combustion of polyvinyl chloride wastes, and, in addition, in particular a high content of $SO_2$. Moreover, their content of primary dust is usually significantly higher than that of off-gases from aluminium melting furnaces.

Therefore, although in the Bischoff plant (German Auslegeschrift No. 2,408,222) the dry purifier can be either an electrostatic purifier (electrofilter) or a mechanical purifier (cyclone dust remover), the use of an electrostatic dry purifier, which is more expensive per se, is always demanded in the case of known processes for the purification of off-gases having a high content of acid components, such as, for example, in the process described in German Auslegeschrift No. 2,431,130 of Walther und Cie AG, Cologne, Germany. Before purifying the off-gases in an electrofilter, the flue gases, in this known process, are first mixed with a salt solution which is as concentrated as possible and is taken from the process itself, in particular by spraying into a spray dryer (evaporative cooler) charged with the flue gases, and the resulting flue gas/salt solution mixture is evaporated. Only then is the dust constituent precipitated in the electrofilter.

In the scrubber, the Walther process operates in principle with alkaline wash liquids, especially those containing sodium ions and ammonium ions, whereby concentrated salt solutions are obtained in the scrubber and these are recycled into the evaporative cooler (spray dryer).

A further known process according to U.S. Pat. No. 3,929,963 of S. I. Taub (E. I. DuPont de Nemours and Company) also employs an evaporative cooler and a solid pollutants precipitator located downstream of the cooler, for example a baghouse or similar fabric filter in which the solid pollutants are removed from the off-gas as completely as possible, by which means the need for a slurrly separator is avoided. The off-gases, which have been substantially free from solid pollutants, are then subjected to scrubbing by means of a wash solution, the pH value of which in the scrubber or in the return line from the scrubber to the evaporative cooler can be so adjusted, by adding salt-forming chemicals, that a water-soluble or water-insoluble salt is formed with the gaseous acids or with other, basic pollutants taken up by the wash liquid, whereafter the resulting solution or suspension is recycled into the evaporative cooler and is there mixed with off-gases, which latter are thereby cooled to a temperature which is still above the dew point (of the mixture), which salt is precipitated in solid form.

These known processes suffer from a number of drawbacks which increase the cost of operation of the plants and increase the consumption costs for chemicals to an economically highly undesirable extent.

In the operation of the plant according to German Auslegeschrift No. 2,408,222 (Bischoff), off-gases, especially from an aluminium salt melt which is covered with a layer of salts such as sodium chloride or potassium chloride, at temperatures far above 400° C. and usually of 800° to 1,000° C. are fed directly into an evaporative cooler. In the evaporative cooler, the hot off-gases take up very large amounts of water from the aqueous suspension of harmful substances which is sprayed into this cooler and which is taken from a subsequent stage of the process, and these amounts of water are, moreover, increased by further absorption of water in the subsequent scrubbing. The total amount of water taken up by the stream of off-gas firstly results in a considerable increase in the volume of gas to be purified and thus in a substantial, expensive increase in the size of the scrubbing apparatus and, secondly, in the formation of an undesirably intense plume of condensed water vapour at the outlet of the chimney from which the purified off-gases are released into the surrounding air.

Whilst the main object of the scrubber is, in particular, to remove gaseous pollutants such as HCl, HBr, $H_2F_2$, $Cl_2$, $Br_2$ and $SO_2$ and also sulphuric acid mists from the off-gas, a further important function of the scrubber is to cool the gases, whereby initially gaseous tar-like substances and also salt-like substances can be condensed and then precipitated.

However, this treatment frequently causes precipitates on the walls of the various washing stages in the scrubber and also in the sludge separator, which precipitates form crusts or caking on these walls and in the outlets from the scrubber and impair the functioning of the entire washing apparatus to an increasing degree the longer the apparatus is in operation. These incrustations or caking consist, for example, of gypsum, lime, metal salts and other solids.

All of the above-mentioned known plants of the initially described type further have the common disadvantage that the walls of the evaporative cooler, which come into contact with the hot off-gas (temperature above 120° C.) and the wash liquid which is recycled from the scrubber and sprayed into this gas, and with the water vapour released from this liquid, are subject to severe corrosion, especially since, for economic reasons, these walls are manufactured from iron. Such walls usually have a life of one to at most two years.

This problem is recognised, for example, in German Offenlegungsschrift No. 2,746,975 of Shell International Research Maatschappij B.V. and, according to this Offenlegungsschrift, is said to be solved by forming a shield of protective gas covering the walls in danger of corrosion, by appropriate introduction of a cold, particle-free, purified product gas as the "protective gas", which prevents the hot fed-in off-gas and the aqueous suspension of particulate mass which is simultaneously added to the hot gas, from coming into contact with the walls threatened with corrosion.

The production and supply of the requisite highly purified protective gas of course requires a large number of additional apparatus, such as tubes, pumps and the like, even when the protective gas can be produced in adequate purity and at adequately low temperature in the plant itself.

A principal object of the invention is, therefore, to provide a process and a plant in which the danger of corrosion of the walls of the evaporative cooler, especially when these are made of iron, is substantially avoided and, as a result, the life of the evaporative cooler is substantially lengthened.

A further object of the invention is to provide a process for purifying off-gases in the plant described initially, which process likewise permits a large proportion of the energy content of the off-gases to be utilised before they enter the plant, and in the manner customary hitherto, for example by indirect release of heat in a steam boiler, while the process will at the same time produce clear effluents which have a low degree of contamination and can be disposed of easily; another object being that the plant for precipitating the solid particles downstream of the evaporative cooler should not require any expensive, complicated apparatus, such as electrofilters or baghouses, and the total space requirements thereof should preferably not be greater than those of an electrofilter of approximately the same efficiency.

Furthermore, it is an object of the invention to keep the amount of chemicals required for the plant, in particular in the scrubber, as far as possible, lower than that in the known processes described, and to suppress the formation of incrustations or caking, in particular in the apparatus of the scrubber, as far as possible.

These objects are attained in accordance with the invention by a process of the type initially described, wherein those walls of the evaporative cooler which come into contact with the mixture of off-gases and recycled suspension or solution of pollutants and which consist of a material that can be corroded by an acidic mixture of this type at room temperature, are heated from the outside to a temperature above the dew point.

For, it has been found that even when the hot off-gases introduced were at a temperature high enough to enable a temperature above the dew point to prevail in the mixing space of the evaporative cooler as the pollutant suspension recycled from the slurry separator is sprayed in, nevertheless, a heat-insulating coating formed on the walls of the evaporative cooler which came into contact with this mixture, through which coating a strong corrosive action was exerted from the interior of the mixing space on the cooler walls of corresponding lower temperature, underneath the coating. Surprisingly, this corrosion of the walls of the evaporative cooler was largely or completely eliminated when the said walls of the evaporative cooler were heated from the outside.

Heating of these walls can be effected by means of a heating jacket which surrounds them or by heating coils laid inside the walls. The heating gas used can, if desired, also be the off-gas itself, which is first fed, at a correspondingly higher temperature, through the heating unit of the evaporative cooler walls and only then is fed into the mixing space of the cooler, the pollutants suspension then being fed into the mixing space, for example by spraying in through nozzles or in another manner known per se. The expensive use of corrosion-resistant walls in the evaporative cooler is thereby avoided.

When carrying out the process according to the invention, the pH value of the liquid phase in the slurry separator and in each of the gas wash stages of the scrubber directly upstream of the separator is, as a rule, kept below 4.

Operating the said apparatus of the scrubber in a pH range below 4 substantially or completely avoids the undesired formation of crusts or caking, mentioned hereinbefore, in the wash apparatus and in the sludge separator.

The dry purifier used is preferably a mechanical dust remover, especially a cyclone dust remover which utilises the effect of centrifugal forces to remove solid particles from the off-gases, but which preferably leaves a proportion of the solids (metal oxides and the like) in the off-gases fed to the scrubber from the dry purifier.

The walls of the dry purifier are also preferably heated from the outside in the same manner as described further above. Thereby, special measures to provide protection against corrosion can be saved, and these walls can also be made of iron or steel.

The amount of the pollutants suspension fed into the evaporative cooler requires, taking into account the pH value of the suspension, only to be such that the content of acidic pollutants which has remained in the off-gases after their admixture with the suspension and after their passage through the dry purifier is sufficiently high to afford in the downstream scrubber a pollutants suspension which has a pH value below 4.

The proportion which can be evaporated, of the liquid phase of the pollutants suspension to be fed into the evaporative cooler, should be at least 70, but preferably at least 90, percent by weight.

Preferably, the pH value of the wash liquid in the final wash stage of the scrubber and in the sludge separator which is connected directly downstream thereto, should be kept above 1 and preferably between 2 and 3.5. It is possible to save chemicals by adjusting the pH value to this range, when care is taken that the proportion of solid pollutants, precipitated from the off-gases when passing through the dry purifier, is only such that the proportion of these pollutants (for example metal oxides) which remains in the off-gases suffices to keep the pH value of the wash liquid within the desired range of pH values without the addition of basic chemicals (for example sodium hydroxide solution) or with only a small addition of such chemicals.

Whilst the pH value of the wash liquid which is cycled via one or more wash stages and through the sludge separator must, as a rule, be kept at a pH value of under 4, the pH value of the suspension or solution of harmful substances which is withdrawn form the slurry separator and fed to the evaporative cooler can also be adjusted to above 4, although the mixture of this pollutants-containing liquid and of the off-gases, which is formed in the mixing chamber of the evaporative cooler and comes into contact with the walls of the latter, should again have in contact with water an acid pH value, i.e. the pH value of the liquid recycled into the evaporative cooler is dependent on the content of acid pollutants in the off-gases.

The pH value should preferably be only so far below 4, but above 1, that the content of acidic pollutants in the off-gas released from the plant, which content increases with increasing acidification of the circulating wash liquid during the washing process due to the resulting decrease in absorptive capacity of the said liquid for these pollutants, remains below a certain limit value which is to be maintained in the operation of the plant; this limit value, in turn, should usually be as far as possible below any minimum level which may have been legally prescribed for acidic pollutants in off-gas released into the atmosphere.

Furthermore, this combination of measures, according to the invention, in the evaporative cooler, the dry purifier and the scrubber surprisingly has the result that, by spraying this pollutants suspension into the evaporative cooler, the precipitation of the water-insoluble primary dust from the off-gases, due to agglomeration of fine dust particles, and the subsequent precipitation of the same in the dry purifier is increased to such an extent that the wash liquid in the scrubber remains exceptionally clean. Furthermore, as a consequence of this, a slurry phase (pollutants suspension) which has a low content of pollutants and is of very low viscosity forms in the sludge separator. This is no way impairs the effectiveness of spraying pollutants suspension into the evaporative cooler, since the effect described above, of agglomeration, would also be achieved by spraying in fresh water.

This "back-coupling effect" is unexpectedly so strong that the wash liquid remains extremely clean and suspensions of pollutants are obtained which are particularly easy to pump and which permit trouble-free use of packed wash towers and X-separators in the scrubber, i.e., without causing any blockages, as would be expected with the dirty slurry phases and effluents from the known processes.

In industry, the said "pollutants suspensions" are also termed "slurries". They are aqueous suspensions of solid pollutants, which pollutants are described more in detail below, or aqueous emulsions of liquid, water-insoluble pollutants, or aqueous mixtures which consist of such a suspension and emulsion, of relatively low viscosity and of a density which is preferably about 1 and up to about 1.3 g/ml.

If the pollutants are water-soluble, they are in solution in the aqueous phase of the "pollutants suspension" and, above the saturation point, the excess of water-soluble pollutants is in suspension.

Pollutants which are to be removed from industrial off-gases with the aid of the process according to the invention are not only those pollutants which can be collected by the conventional dry purification of flue gases by means of electrofilters and which, at the temperatures prevailing in the electrofilter, condense to sufficiently coarse dust or mist particles, but also oils or tar-like substances and also that portion of the metal oxides or salts, contained in the flue gas, which forms an aerosol only when the off-gases are cooled upon issuing from the stack of the plant and thus lead to contamination of the environment, and, furthermore also harmful gases such as HCl, $H_2F_2$ or $SO_2$, which cannot be separated off by means of an electrofilter.

As evaporative coolers (or spray dryers) there can be used spray dryers of the type manufactured by NIRO Atomizer Ltd., Copenhagen, Denmark, and described in "Food Engineering" of February 1966, pages 83–86. They contain a mixing chamber or similar chamber in which the pollutants suspension is sprayed into the off-gases flowing through this chamber.

As has been mentioned hereinbefore, the dry purifier used can be a mechanical dust remover, for example a cyclone dust remover of known construction. Thus, in contrast to known processes, no electrofilter (electrostatic dust remover) or baghouse is required in this case.

Preferably, installations which comprise at least one of the flue gas washing towers of the type described by Fattinger, Schmitz and Schneider in Publication No. 107 "Technik der Abgasreinigung" ("Technology of Off-gas Purification") of the "Tagung Lufthygiene 1976" ("Conference on Air Hygiene 1976") of 3rd December 1976 published by Verein für Wasser- und Lufthygiene (VFWL) of Huttenstrasse 36, 8006 Zürich, Switzerland, are used as scrubbers (see FIGS. 1 to 4 therein).

Preferably a tower of this type having the X-separator described in the cited publication is used.

The water which is to be added to the scrubber as a replacement for the amounts of water removed from the plant together with the purified off-gases can be fresh water or waste water and can therefore be fed in at various points into the scrubber, either as fresh water, or as waste water, or as an aqueous suspension of solid pollutants and/or as an aqueous emulsion of liquid pollutants of the type mentioned further above.

The separation of the pollutants suspension from the wash liquid takes place in a separating means which in this specification is termed a "sludge separator" for reasons of brevity. It replaces the apparatus termed a "Thickener" in German Auslegeschrift No. 2,408,222. Advantageously, a novel type of sludge separator constructed by Jürg Schneider is used and the construction and mode of operation of this separator are described in more detail below.

Preferably, the sojourn time of the off-gases in the mixing space of the evaporative cooler in contact with the pollutants suspension is at least 2 seconds.

When the "sojourn time" is less than 2 seconds, i.e. when the mixing space is too small, the finer pollutant particles may no longer be sufficiently agglomerated to larger particles; this agglomeration, however, is necessary if satisfactory precipitation in the dry purifier is to be achieved. In the evaporative cooler, the sprayed-in pollutants suspension (slurry) must have a sufficiently long time to take up the finer fraction of dust from the off-gases. Furthermore, when the sojourn time is too short, baking on of salts and the formation of crystals can take place on the lower parts of the walls of the mixing space in the evaporating cooler, because particles which are still moist can reach the wall of the mixing space.

On the other hand, the evaporative cooler must be of a larger and more expensive design for the same amount of off-gas if longer sojourn times are to be achieved, without resulting in a corresponding improvement of the process. Evaporative coolers which are too large are therefore uneconomic in operation.

In operation, the temperature of the off-gases in the dry purifier (cyclone dust remover) should be kept below 200° C., and preferably below 170° C., by introducing a corresponding adequate amount of pollutants suspension in the evaporative cooler, i.e., in order to save energy, this temperature should not be too far above the dew point of the particular acid. Under the slight excess pressure (0.1 to 0.5 bars) prevailing in the evaporative cooler, the dew point for hydrochloric acid is at about 120° C., and for sulphurous acid it is at about 160° C.

If the temperature of the off-gases in the dry purifier exceeds 170° C., the solid particles or liquid droplets of the pollutants to be precipitated therein are usually not sufficiently condensed. If the off-gas leaves the dry purifier at too high a temperature (above 170° and at most 200° C.), then too much water will be evaporated from the wash liquid in the subsequent scrubber, and become entrained in the off-gas and removed from the plant, and the concentration of pollutants in the pollutants suspension will be too high and the wash liquid will therefore be too dirty, which results in an inadequate purifying effect when this liquid is recycled through the scrubber. The wash liquid can even become supersaturated with salts, so that salt crystallisation in the scrubber can in some cases result in choking up the latter.

Preferably, the off-gases to be purified are at a temperature in the range from 150° to 400° C. when they are introduced into the mixing zone of the evaporative cooler. This corresponds to an outlet temperature from the cooler of above 120° to 170° C.

If the off-gas fed into the evaporative cooler is at a temperature below 150° C., the energy consumption for heating the above-mentioned mixing chamber of the evaporative cooler in order to maintain a temperature above the dew point of water, i.e. in order to prevent condensation of pollutants and their deposits on the walls of the evaporative cooler, is usually too high to enable the plant to be operated economically.

When the off-gases fed into the evaporative cooler are at temperatures above 400° C., the exit temperature of the purified off-gases at the outlet of the plant becomes too high; a higher exit temperature of the off-gas means the absorption of larger amounts of water, as a result of which the internal heat exchange system of the plant must be designed on too large a scale. With an upper temperature limit of 400° C. for the off-gases to be treated in the evaporative cooler, the heat exchange system coupled with the wash liquid cycle of the scrubber already operates at 70°–80° C., i.e. already fairly close to the theoretical limit given by the boiling point of the wash liquid for plants operating without excess pressure installations.

By maintaining the minimum sojourn time mentioned for the off-gases in the mixing space of the evaporative cooler (2 seconds) and by maintaining the temperature of the off-gases in the dry pruifier below 170° C., a particularly satisfactory purification of the off-gases is achieved with feed temperatures in the above-mentioned range of 150° to 400° C.

The preferred mode of carrying out the process according to the invention in practice demands that the pH value of the liquid in the slurry separator and in the gas washing stage or stages of the scrubber directly upstream of this separator remain below 4, i.e. that no basic neutralising agents, or only very small amounts of basic neutralising agents (e.g. sodium hydroxide solution) be added to the wash liquids or (e.g. milk of lime) to the pollutants suspension, whilst in known processes, for example that of German Auslegeschrift No. 2,431,130 of Walther und Cie AG, Cologne, Germany, the acid components of the off-gases, in particular $SO_2$, must be fully neutralized to the corresponding, preferably water-soluble, salts by chemical reaction with an alkaline solution. In this known process, the pH value of the liquid in the work cycle should be between 4.0 and 7.8, but in practice below a pH of 6.5 only when the proportions of acid components are very small, while as a rule it should be between 6.5 and 7.5, i.e., substantial amounts of basic substances are required. However, in the process according to the invention, operation at a pH value above 4 would easily result in precipitates in particular in the scrubber plant to such a degree that the entire plant would be blocked.

The process of the present invention is preferably carried out with a highly acid wash liquid having a pH value of below 2, in the sludge separator and in each wash stage directly upstream thereof, thus saving costs for alkaline chemicals.

Only if the HCl content and $SO_2$ content of the off-gases to be purified is particularly high (above 2 g/Nm$^3$ of $HCl+SO_2$) is it advisable partially to neutralise the concentrates of pollutants which are recycled continuously from the scrubber to the injection nozzle of the evaporative cooler to a pH value of 2 to 4 before they enter the latter. The recycled pollutants suspension can even be somewhat alkaline, but only to such an extent that it is subsequently rendered acid again (pH value less than 4) in the scrubber, due to the content of acid pollutants in the off-gases.

In a preferred construction of the evaporative cooler, designed by the applicants, heating of the outside surfaces of the inner walls surrounding the mixing zone of the evaporative cooler which walls come into contact with the off-gases to be purified by means of the hot off-gases sweeping along these outer surfaces, enables maintaining these inner walls at a temperature such that there will be no condensation on these walls, pollutants, which gives rise to corrosion problems, (i.e. makes it obligatory to use special, corrosion-resistant materials in building the evaporative cooler) and, moreover, impairs the production of granules of pollutants which are satisfactorily dry, in the evaporative cooler and dry purifier.

This temperature control of the said inner walls can, however, also be achieved by indirect heating of the said walls of the mixing space by means of superheated steam. Advantageously the jacket of the dry purifier, i.e., preferably a mechanical dust remover, especially a cyclone, is also indirectly heated, so that condensation of corrosive pollutants, especially hydrochloric acid or sulfuric acid, is also prevented on the inner wall faces of the purifier.

The combination of the three above-mentioned measures according to the invention, i.e. heating of the walls in the evaporative cooler, maintaining the wash liquid at a pH value below 4, and holding the vaporisable proportion of the liquid phase of the pollutants suspension recycled into the evaporative cooler at least at 70, but preferably at 90 or more, percent by weight, makes it possible, as has been stated, to use walls made of corrodable material, especially of iron, in the evaporative cooler, these walls having a life of more than two years, while the installations of the scrubber can be constructed of synthetic plastic material, in a modern manner.

Preferably, the walls of the evaporative cooler and of the dry purifier which are in contact with the offgases are heated sufficiently to be maintained at a temperature which is the equal to, or above, that temperature which is attained adiabatically in the off-gas after the entry gas has been mixed thoroughly with the sprayed-in pollutants suspension.

It is advantageous to keep the temperature of the walls of the said mixing space in the evaporative cooler which are in contact with the off-gas to be purified, and also the corresponding walls of the mechanical dust remover, at more than 5 degrees centigrade above the dew point of the acid in the mixture formed from the off-gas and the sprayed-in pollutants suspension.

Particularly good results are obtained when, on the one hand, the sojourn time of the off-gases in the evaporative cooler is from 3 to 7 seconds and, on the other hand, the temperature of the off-gas in the mechanical dust remover (cyclone) is kept at 140° to 150° C.

When the velocity of the gas flowing through the scrubber is greater than one m/sec., a wash tower charged with a packing layer is advantageously used in the scrubber, the packing layer preferably consisting of hedgehog packing units (see FIG. 7 of the abovementioned description of the Verein für Wasser- und Lufthygiene, [VFWL], Zurich). The free cross-sectional area of the wash tower through which the off-gas flows is advantageously so chosen that the gas speed is more than one m/sec.

Figure 2:
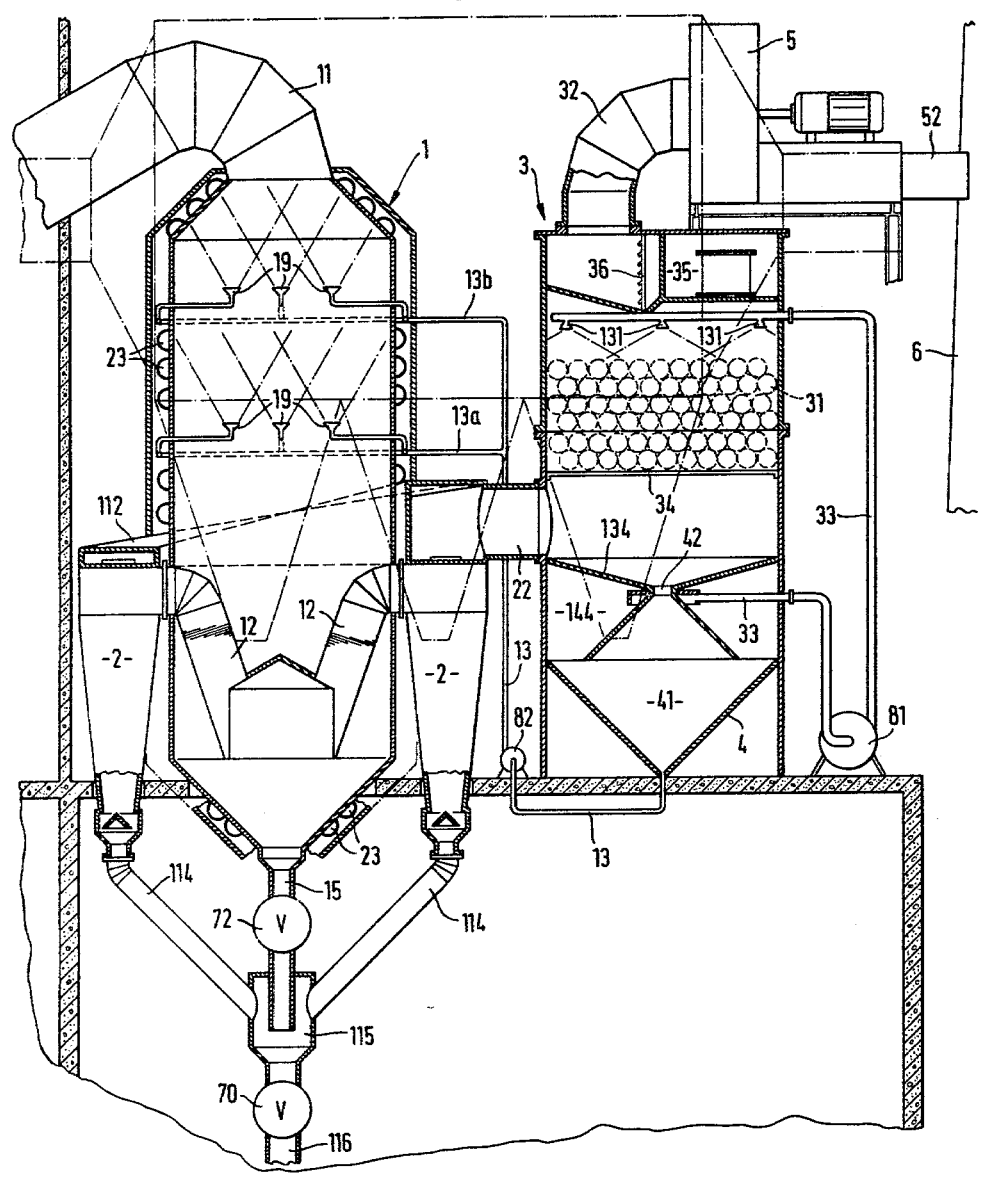
Figure 3:
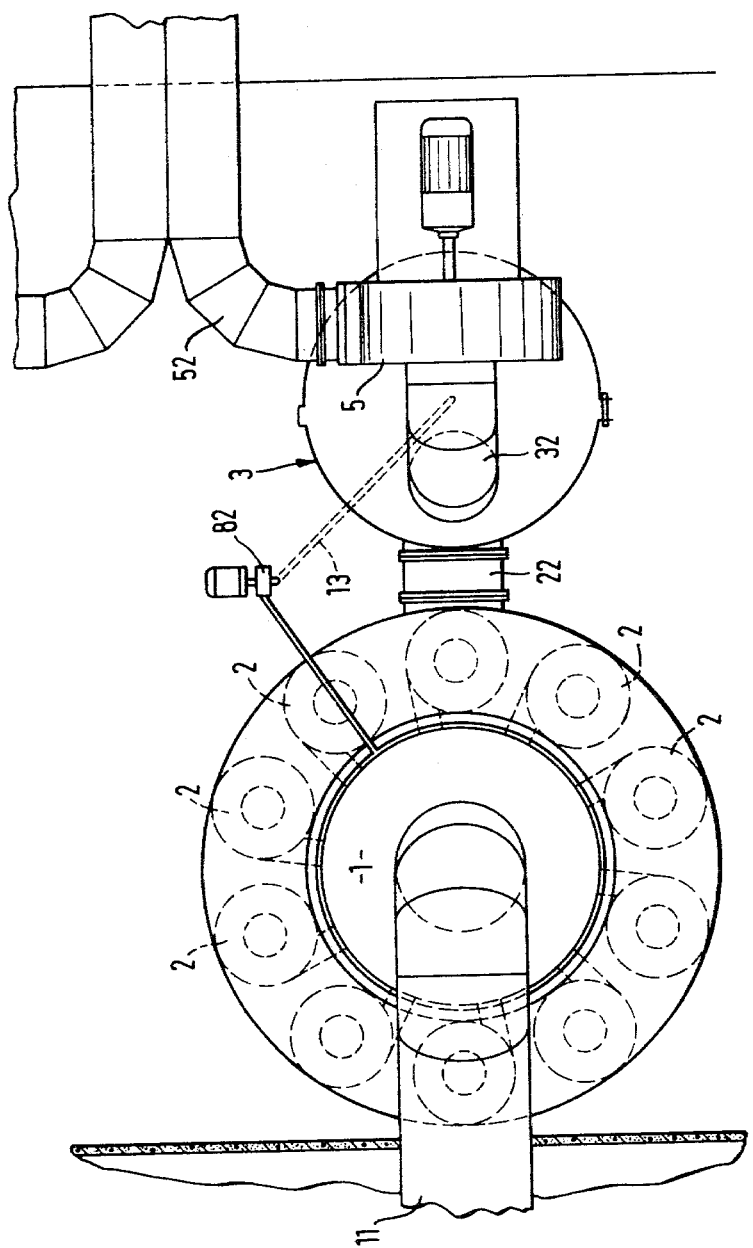

Furthermore, the scrubber can advantageously contain a wet-mechanical mist and dust (aerosol) separator having a gas resistance of 5 to 60, and preferably of 10 to 30 mbars. The aerosol separator used is preferably a X-separator, which is also described in the said publication by the VFWL, Zurich (FIGS. 2 and 3).

Preferably, more than 50% by volume of the circulating liquid, which flows through the first gas wash stage downstream, in the direction of gas flow, from the mechanical dust remover, is fed through a settling container of the sludge separator (thickener), but optionally from 70 to 100% of the said liquid are fed through the container, the sojourn time of the liquid in the settling container of the sludge separator being, depending on the size of the latter, preferably between 1 and 8 minutes but optionally from 3 to 5 minutes.

The waste water used to replace water removed from the plant together with the off-gases is preferably slag-quenching water from a waste incineration plant. This waste water can be fed into the wash liquid cycle but is preferably fed into the sludge separator.

Finally, a heat exchanger can be inserted in the wash liquid cycle of the scrubber; this heat exchanger cools the wash liquid and releases the heat withdrawn therefrom, preferably in a heat pump system, via a second heat exchanger to the conventional auxiliary air, which is thereby heated up and is then mixed in to dilute the purified off-gases in the stack of the plant.

It is also possible to meter into the pollutants suspension which is to be fed to the evaporative cooler from the sludge separator and which may have been partially neutralised as mentioned above, a binder and/or a chemical constituent which binds the salts present therein in the solid phase of the pollutants and also at the same time reduces their solubility in rain water, this constituent being, for example, a silicate, such as waterglass.

Further details of the invention can be seen from the following description in conjunction with the appended drawings, in which FIG. 1 shows schematically a first embodiment of a plant for carrying out the process of the invention, FIG. 2 shows schematically a preferred practical arrangement of the embodiment according to FIG. 1, in a side view, FIG. 3 shows a plan view of the arrangement according to FIG. 2.

Figure 4:
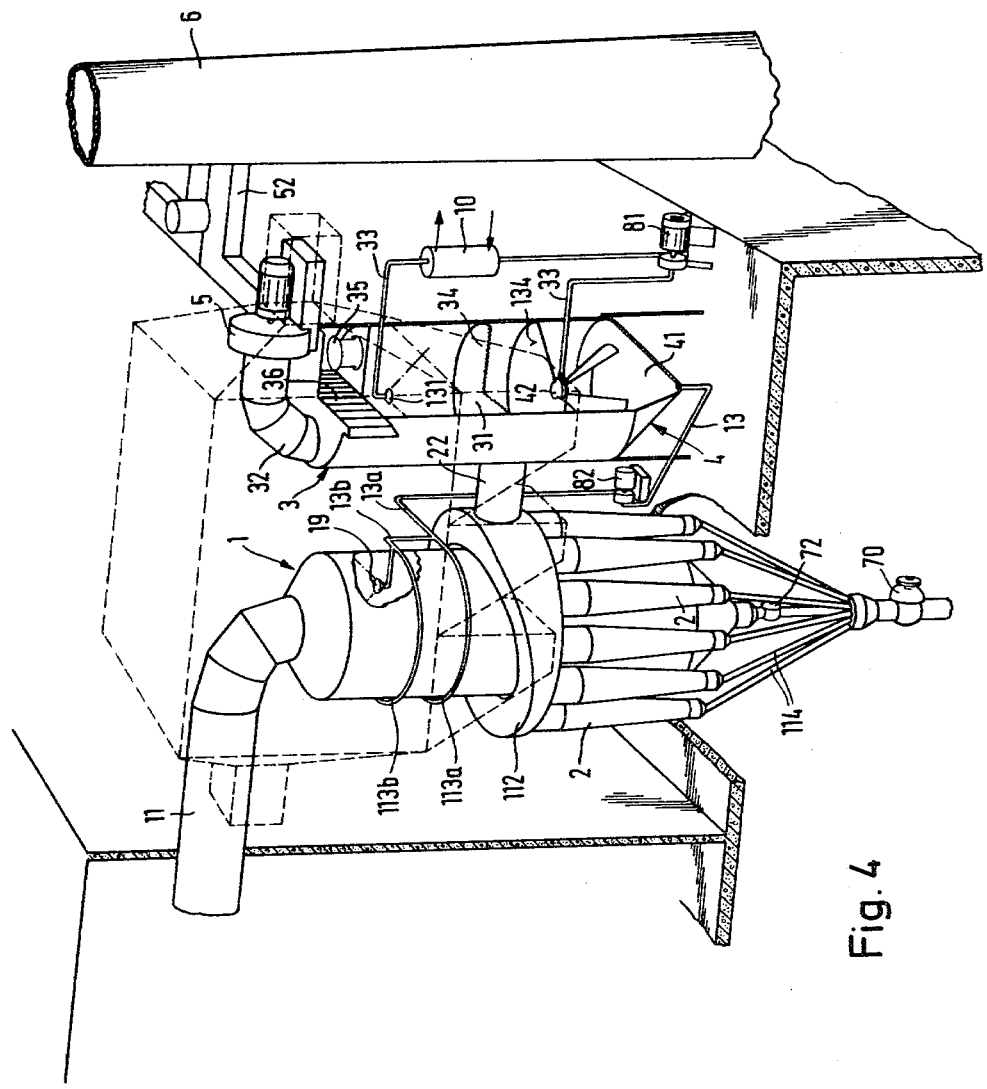
Figure 5:
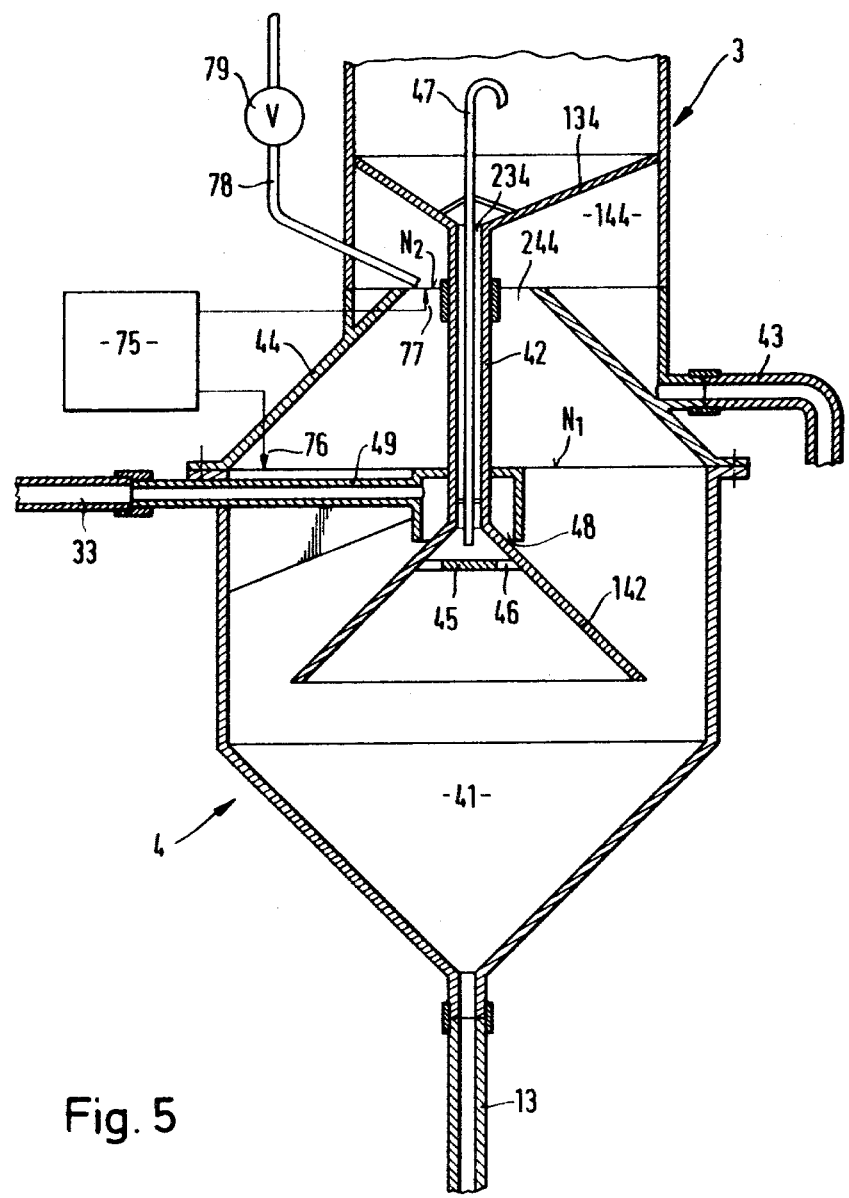

FIG. 4 shows a perspective, partly cut-away view of the plant according to FIGS. 2 and 3, FIG. 5 shows a schematic representation of a longitudinal section through a preferred embodiment of the sludge separator in the plant according to FIGS. 1 to 3, and FIG. 6 shows a schematic representation of a second embodiment of the plant, which is particularly suitable for those cases in which as small as possible a plume of water vapour at the outlet of the stack is demanded when the purified off-gases are released into the atmosphere.

The plant shown in FIG. 1 comprises an evaporative cooler 1, the outer walls of which are surrounded by an insulating jacket 17. In the interior of the evaporative cooler 1 there is provided a cylindrical partition 18, which separates a mixing and reactor space 100 from an outer annular chamber 101 which surrounds this space. An off-gas feed line 11 for feeding the off-gas to be purified into the plant opens into this outer annular chamber 101. The cylindrical partition 18 has openings at its upper end which establish free communication between the mixing chamber 100 and the outer toroidal chamber 101. An atomizer nozzle 19, through which liquid can be sprayed into the mixing chamber 100, is provided at the upper end of the latter. An off-gas line 12 leads from the lower region of the mixing chamber 100 into a cyclone dust remover 2. The walls of the off-gas line 12 and the outer walls of the cyclone dust remover 2 are surrounded by a heating jacket 20, in which coils of semi-cylindrical tubes 23 are provided for heating the cyclone dust remover and the off-gas line 12. An outlet line 15 is located at the lower end of the mixing chamber 100, outlet lines 14 are located at the lower end of the annular chamber 101 and an outlet line 24 is located at the lower end of the cyclone dust remover 2; precipitates from the off-gas can be run off, in solid or liquid concentrated form, through these lines from the evaporative cooler and from the cyclone dust remover 2 into a dust collection vessel 9.

Running off is preferably effected batch-wise and is controlled via valves 71, 72 and 74, which are provided in the lines 14, 15 and 24 respectively. The semi-cylindrical tubes 23 are heated by means of superheated steam, which is introduced via a steam line 231. Water which condenses in the semi-cylindrical tubes is run off continuously via a condensate line 232 into a condensed water collector 233.

A gas transfer line 22 leads from the upper region of the cyclone dust remover 2 into the central region of a wash tower 3 of a scrubber.

The central region of the tower 3 is filled with a layer 31 of packing units, which rests on a transverse grate 34. An injection nozzle 131, which is used to spray the packing layer 31 with wash liquid from a liquid circulating line 33, is located above the packing layer 31 in the wash tower 3. An aerosol separator 35, preferably a X-separator, is placed above the layer 31 in the upper part of the wash tower 3 and the slotted wall 135 of the aerosol separator 35 is sprayed via a spray nozzle 133 with wash liquid which is fed to the nozzle 133 from the circulating line 33 via the branch line 133a. The aerosol separator 35 is in free communication on the one hand, with the interior of the wash tower 3 and, on the other hand, through the slotted wall 135, with a mist collector 36. A spray nozzle 136, into which a fresh water feed line 90 provided with a shut-off valve 91 opens, is arranged in front of the mist collector 36. The fresh water sprayed in via the spray nozzle 136 rinses the walls of the mist collector 36 and collects in a collection vessel 92 from which it flows via the line 192 into the wash tower 3 above the packing layer 31. A gas line 32 for the purified off-gas leads from the mist collector 36 via a fan 5 into a gas outlet line 52, which opens into a stack 6. A sludge separator 4, the construction of which is described further below in more detail in connection with FIG. 5, is located at the lower end of the wash tower 3. Wash liquid is pumped from the sludge separator 4 by means of a pump 81 through the circulating line 33 to the nozzles 131 and 133.

The settling container 41 of the sludge separator 4, which is filled by wash liquid, has, at its upper end, a conical partition 44 which is tapered upwards and towards the centre.

The wash liquid, from the nozzle 131, which trickles downwards in the tower 30 collects on the base 134, which is inclined conically downwards towards the centre of the wash tower 3 and flows from there through an outlet line 42, which extends through the opening 244 in the centre of the partition 44 downwards into the settling container 41. A scum outlet 43 leads from the annular space 144, which is located above the partition 44 and below the base 134, via a shut-off valve 87 downwards and joins with a slurry line 13 which leads from the lower end of the settling container 41 of the sludge separator 4 downward via a non-return valve 86.

After joining with the line 43, the line 13 leads via a circulation pump 82, and via a sieve or filter 213 to the upper end of the evaporative cooler 1, where it is connected to the injection nozzle 19. The injection nozzle 19 is designed as a two-component nozzle, and air or steam can be blown in as the atomizing medium via a line 89 and a shut-off valve 88.

In FIGS. 2 to 6, the parts corresponding to the elements of the apparatus in FIG. 1 are characterised by the same reference numbers as in FIG. 1.

In the embodiment according to FIGS. 2 to 4, the evaporative cooler 1 is designed as a cylindrical container. The feed line 11 for the off-gases to be purified in this case opens into the upper end of the evaporative cooler 1, whilst a number of nozzles 19 in a lower position are fed by the branch line 13a, which branches off from the slurry line 13, via a ring line 113a and a number of nozzles 19 in a higher position are fed by the branch line 13b, which branches off from the line 13, via a ring line 113b.

In this embodiment, the nozzles 19 direct the liquid spray cone upwards, that is to say towards the off-gas flowing in through line 11.

Ten cyclone dust removers 2 are arranged around the lower region of the evaporative cooler 1, and the off-gas which leaves the evaporative cooler 1 in its lower region is fed into these cyclone dust removers via ten lines 12. The off-gas, from which the dust has been removed dry in the ten cyclones dust removers 2, passes via a loop line 112, into the gas transfer line 12, throttling of the stream of gas in line 12 being prevented by the fact that the cross-sectional area of the ring line 112 gradually widens towards the last-mentioned line 12. An outlet line 15 for agglomerates of pollutants, which is provided with a shut-off valve 72, is located at the lower end of the evaporative cooler 1, in the same manner as in the embodiment according to FIG. 1.

The lower ends of the cyclone dust removers 2 are connected to outlet lines 114 which, together with the line 15, end in a collection vessel 115 which can be emptied by means of a line 116 provided with a shut-off valve 70.

The off-gas transfer line 22 is connected in the same way as in the plant according to FIG. 1 to a wash tower 3 of the scrubber, which is equipped in the same way as that in FIG. 1.

The preferred embodiment of the sludge separator 4 shown in FIG. 5 also comprises a settling container 41 and a liquid feed line 42, which extends through the central opening 244 in a partition 44 which is tapered conically towards the top and extends towards the centre, into the settling container 41 and is connected, by means of its upper end, to the outlet orifice 234 of the base 134 of the wash tower 3 which base slopes conically inwards and downwards.

At its lower end, the line 42 carries an outlet funnel 142, which widens conically downwards and outwards and is open at the bottom; in the interior of funnel 142 a deflector 45 is fastened, opposite the line 42 and vertical to the end of the line 42, by means of struts 46.

A vent tube 47 is fitted centrally in the feed line 42 by means of struts and the upper open end of this tube ends above the base 134, and the lower open end thereof a short distance above the deflector 45.

The inlet orifice 48 of an outlet connecting branch 49, to which the recirculating line 33 for the wash liquid is connected outside the sludge separator 4, is located in the central region of the container 41, a short distance above the outlet funnel 142.

The partition 44 projects into the lower open end of the wash tower 3 which is fitted on the upper region, surrounding the orifice 244, of the separator 4 and which encloses the annular space 144. A two-position level controller 75 is connected to the sludge separator 4 and, of the two measuring heads or probes 76 and 77 of the controller, the lower measuring head 76 responds when the liquid in the container 41 has fallen to level $N_1$, whilst the upper probe 77 responds when the liquid in the container 41 has risen to the upper limiting level designated $N_2$.

The procedure for operation of the sludge separator 4 is that wash water first flows from the wash tower 3 through the feed line 42 into the container 41 and fills the latter, with the pump 81 inactive and with the valve 86 closed, until the upper level $N_2$ is reached. The pump 81 is then switched on and the valve 86 is opened.

The sludge separator 4 is now operated continuously. The rate of discharge (volume per unit time) of the wash liquid from the central region, which has a low content of pollutants, of the container 41 via the line 33 and the rate of discharge of the pollutants suspension enriched with settling slurry, i.e. slurry having a density of more than 1, through the line 13 added to each other are somewhat greater than the rate at which the wash liquid flows into the container 41 through the line 42.

As a result thereof and of the evaporation, which takes place in the wash tower 3, of a portion of the wash water, the level of liquid in the container falls from the upper level $N_2$ to the lower level $N_1$, the evaporated portion being removed by the off-gases. When this level has been reached, the probe 76 of the level controller 75 responds and opens the valve 91, through which fresh water passes through the line 90 into the wash tower 3, and a non-return valve 79 in a waste water feed line 78 through which waste water now flows directly through the orifice 244 into the container 41. Advantageously, the waste water used to slag-quenching water from a refuse incineration plant.

The level of liquid now rises again in the container 41 until it has reached the upper level $N_2$, whereupon the probe 77 responds and the level controller 75 closes the valves 79 and 91 again.

When the level of liquid rises up to level $N_2$, a layer of scum (density less than 1) which has collected on the surface of the liquid is pushed out upwards from the orifice 244 and runs downwards on the upper side of the conical partition 44 and through the scum outlet 43 to combine with the settling slurry in the line 13. The combined suspension of pollutants formed from the scum and the settling slurry is now pumped up by means of the pump 81 into the nozzles 19 of the evaporative cooler 1.

Preferably, the cross-sectional areas of flow of the lines 42 and 33 are so designed that, when the valve 86 in the main outlet 13 for settling slurry is closed, the amount of wash liquid which flows into the container 41 through line 42 is the same as that which flows out of the said container via line 33. The removal of pollutants suspension via line 13, and from time to time via line 43, as well as the evaporation from the wash tower 3, which both reduce the amount of liquid flowing in through line 42, thus causes the level of liquid to drop from level $N_2$ to level $N_1$ and this drop can thus be influenced primarily by means of the valve 86.

Whilst in the case of a known separator (German Auslegeschrift No. 2,408,222) only a part of the pollutants, specifically the settling slurry constituent, is conveyed into the evaporative cooler and the scum constituent is pumped back into the wash liquid, in the sludge separator according to the invention both the settling slurry and the scum are separated off and back-circulation into the wash liquid is restricted to a minimum (suspension of particles of pollutants having a density of 1).

If a particularly large amount of scum is obtained, it is also possible to provide, in the annular space 144, a special rinsing water line (not shown), from which water is sprayed onto the outer surface of the partition 44 and rinses the scum deposited thereon into the line 43.

The settling of settling slurry from the liquid which flows through the feed line 42 into the container 41 is particularly promoted firstly by the fact that this stream of liquid is broken and divided at the deflector 45 and secondly by the fact that the liquid which then flows down on the inner wall of the outlet funnel 142 if further slowed down by the downwardly widening circumference of the funnel 142.

The throughput rate through the container 41 is very high and in practical operation of the separator 4 about eight times the capacity of the container are circulated per hour; this is in contrast to previously known plants, in which only a small stream of liquid flows into a settling container of large volume and provision is made for a correspondingly small outflow of liquid, so that each circulation of the contents of a container having an identical purifying action requires a ten times greater volume of the container, and about one or one and a half hours are as a rule required for each circulation.

Figure 6:
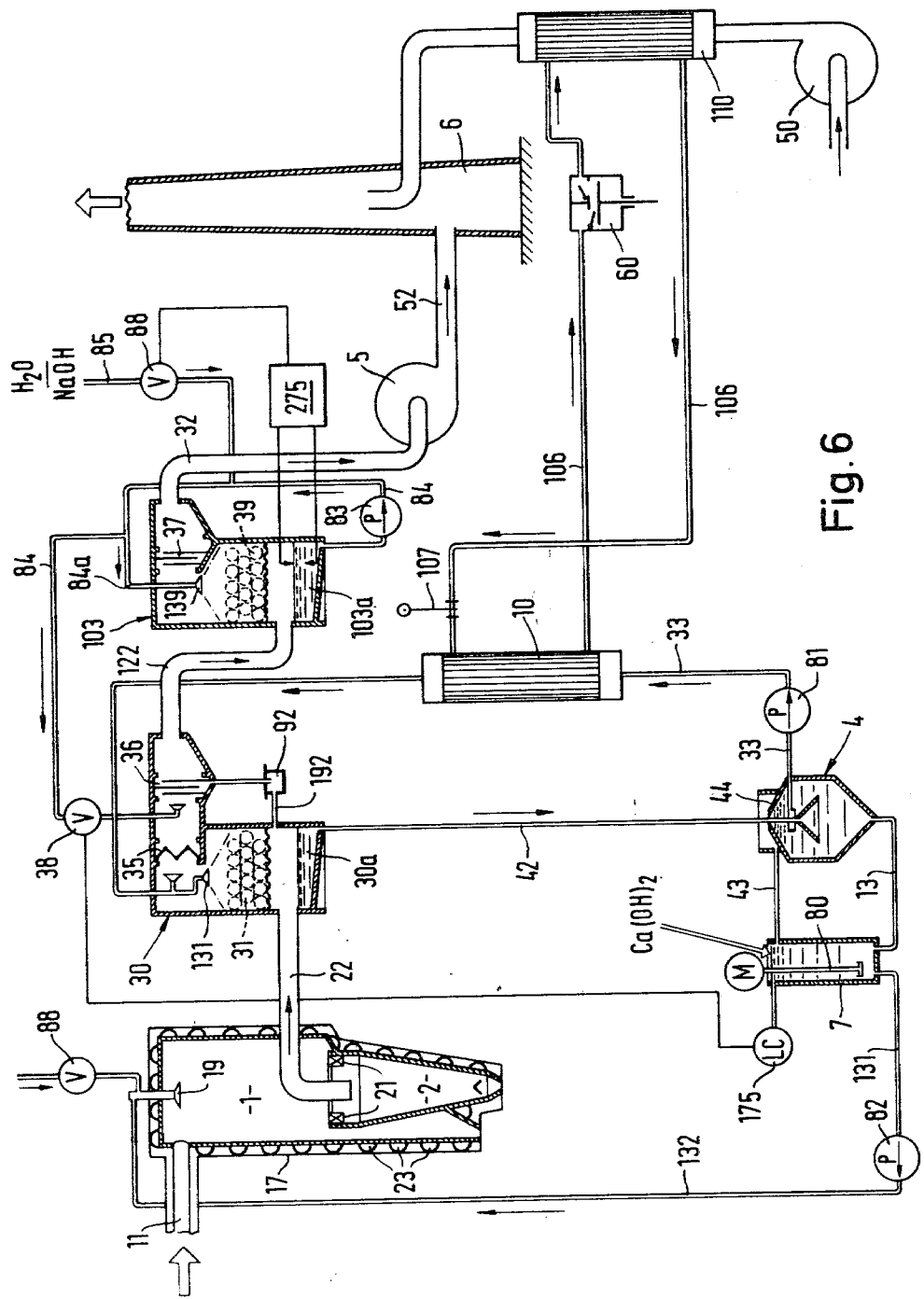

The embodiment of a plant according to FIG. 6 is particularly suitable on the one hand for purifying off-gases which have a particularly high content of acid pollutant components, in particular $SO_2$ gas, and, on the other hand, for those cases in which the plume of condensed water vapour which regularly forms at the outlet of the stack 6 is to be suppressed as far as possible.

In contrast to the embodiments of the off-gas purification plant previously described, the scrubber in the plant according to FIG. 6 comprises two towers connected one behind the other in the direction of the gas flow; the off-gas from the cyclone dust remover 2, into which it has passed through the inlet orifices 21 from the evaporative cooler 1, is first passes via the gas transfer line 22 into the wash tower 30 and from the latter through the gas line 122 into a second wash tower 103 and from the latter tower exclusively, as in the plants previously described, via lines 32 and 52 into the stack 6.

Wash tower 30 has a sump 30a, a grate 34, a layer of packing units 31 and, in its upper region, an aerosol separator 35 and a spray arrestor 36; wash tower 103 also has a sump 103a, a packing layer 39 on a grate and a spray arrestor 37. The wash liquid is first pumped from the sludge separator 4 by means of pump 81 through line 33 into the aerosol separator 35 from where it is sprayed, through nozzle 131, onto the layer 31 of packing units and, from nozzle 133, onto the slotted wall 135, as is also the case in the embodiment according to FIG. 1.

Wash liquid charged with pollutants flows from the layer of packing 31 into the sump 30a and from the latter through the feed line 42 to the settling container 41 of the sludge separator 4.

Settling slurry from the sludge separator 4 passes via line 13, and scum passes via line 43, into a neutralisation vessel 7, in which the suspension of pollutants can be at least partially neutralized by means of milk of lime.

The containers 7 and 41 act as communicating tubes and a level controller 175 opens a valve 38 when the level of liquid in container 7 has fallen to a lower level, and closes the valve 38 when the level of liquid has risen to an upper level.

The container 7 is also fitted with a stirrer 80 and with a motor.

When the valve 38 is opened, wash liquid, which is less charged with pollutants than is the liquid circulating through lines 33 and 42, is pumped from the sump 103a of the wash tower 103 by means of the pump 83 through the line 84 into the spray arrestor 36 of the wash tower 30 and sprayed through the nozzle 136, whilst a portion of the wash liquid from line 84 passes through a branch line 84a into the nozzle 139, from where it is sprayed onto the layer 39 of packing units in the wash tower 103.

From the spray arrestor 36, the wash liquid which has been sprayed in passes via the collection vessel 92 and line 192 finally into the wash liquid cycle of the wash tower 30.

The level of liquid in sump 103a of the wash tower 103 is controlled by a two-position level controller 275 which actuates a valve 88 when the liquid level drops to a lower level, whereby fresh water or, if necessary, when the $SO_2$ content in the off-gases is high, a dilute sodium hydroxide solution, is fed through line 85 into the wash liquid cycle in line 84. When an upper level is reached in the sump 103a, the level controller 275 then closes the valve 88 again.

Finally, the formation of a plume of condensed water vapour at the outlet of the stack 6 can be reduced by blowing air, which preferably has been heated to above 100° C. in a heat exchanger 110, by means of a blower 50 into the stack.

The heat is supplied in the heat exchanger by means of a heating liquid pumped in a cycle in a line 106 by means of a pump 60. The heating liquid takes its heat content in the heat exchanger 10 from wash liquid, from line 33, which flows through this exchanger and is warmed by the off-gases in the wash tower 30 and, if necessary, from an additional heating apparatus 107.

As can be seen from the figures of the drawing, the slurry obtained in the gas scrubber is sprayed, optionally after adding milk of lime, into a reactor (evaporative cooler) and dried by coming into contact with the flue gases which are at a temperature above 200° C. and which leave a boiler in which they had to give up a large proportion of their thermal energy. The finely sprayed slurry binds the major portion of the dust content of the crude gases and, as a result of this binding, the gas contains only a small amount of dust at the outlet of the downstream cyclone 2. The circulating liquid in the downstream scrubber remains relatively pure because adjustment to an optimum temperature in reactor 1 and corresponding control of the composition of the wash liquid make it possible to separate off the slurry virtually completely in the sedimentation apparatus (sludge separator) 4.

When the plant has been in operation for several months, no troublesome incrustations or caking in the wash system or baking on of dust in the dry prepurification (cyclone 2) are observed.

When the flue gases from a municipal refuse incineratior plant were purified, the following advantageous results were obtained, without an expensive electrofilter being required:

Content of pollutants in the purified off-gas to be released into the atmosphere:

Dust content reduced to below 50 mg/Nm$^3$ (measured after gas cooling)
Free hydrochloric acid less than 5 mg/Nm$^3$
Total chloride content (as Cl$^-$) less than 15 mg/Nm$^3$
SO$_2$ less than 100 mg/Nm$^3$
Nitrogen oxides less than 100 ppm.

Furthermore, the following advantages were obtained:

Utilisation of the temperature of the flue gas (after the boiler) for drying the slurries obtained in the gas scrubber and for removing the slag-quenching water from the incineration plant.
Conversion of all precipitated pollutants to a free-flowing ash.
Low consumption of water (less than 50 kg/1,000 Nm$^3$ of flue gas)
Very low consumption of milk of lime (less than 50 g of Ca(OH)$_2$/1,000 Nm$^3$ of flue gas)
Low expenditure of energy by virtue of the use of a X-separator for separating off the aerosols (fan differential pressure less than 360 mm of water column).

What is claimed is:

1. A process for purifying the off-gases from industrial furnaces, especially from waste incineration plants, in which process the off-gases, which contain harmful substances selected from acid, neutral and basic pollutants in the gaseous or solid form or in the form of a mist, are treated in an evaporative cooler and then in a dry purifier, in which they are freed from at least a substantial portion of the solid pollutants, and then in a scrubber by means of a wash liquid, the temperature of the off-gases in the evaporative cooler being kept above the dew point, and the wash liquid in the scrubber being cycled through a sludge separator, from which suspension or solution of pollutants is withdrawn, said withdrawn suspension of pollutants being fed from the sludge separator to the evaporative cooler and mixed in a mixing space in the latter with the hot off-gases, with the gases and the suspension being separately removed from the bottom of the evaporative cooler; those walls of the evaporative cooler which come into contact with the mixture of off-gases and recycled suspension or solution of pollutants and which consist of a material that can be corroded by said mixture at room temperature being heated to a temperature above the dew point by passing a heating medium through a heating unit which surrounds said walls.

2. A process as described in claim 1, wherein the heating medium used for heating the said walls is the off-gas to be purified, which is first fed, at a correspondingly higher temperature, through the heating unit of the evaporative cooler and only then is fed into the mixing space of the latter.

3. A process according to claim 1, wherein the pH value of the liquid phase in the sludge separator and in each of the gas wash stages of the scrubber directly upstream of said separator is kept below 4.

4. A process as described in claim 1, wherein a portion of the solid pollutants is removed mechanically in the dry purifier, another proportion of the solids being left in the off-gases fed to the scrubber from the dry purifier.

5. A process as described in claim 4, wherein the dry purifier used is a cyclone dust remover wherein solid particles of pollutants are removed from the off-gases by centrifugal force.

6. A process as described in claim 1, wherein the walls of the dry purifier are heated from the outside.

7. A process as described in claim 1, wherein the amount of the suspension of pollutants fed into the evaporative cooler is, taking into account the pH value of the suspension, only such that the content of acid pollutants which remains in the off-gases treated with the suspension and passing through the dry purifier is sufficiently high to afford a pollutants suspension which has a pH value below 4 in the downstream scrubber.

8. A process as described in claim 7, wherein the proportion which can be evaporated of the liquid phase of the pollutants suspension to be fed into the evaporative cooler is at least 70 percent by weight.

9. A process as described in claim 9, wherein the pH value of the wash liquid in the final wash stage of the scrubber and the sludge separator which is directly downstream of said final wash stage is kept above 1.

10. A process as described in claim 10, wherein the proportion which can be evaporated of the liquid phase of the pollutants suspension to be fed into the evaporative cooler is at least 90 percent by weight, and the pH value of the wash liquid in the final wash stage of the scrubber and in the sludge separator which is directly downstream of said final wash stage is kept in the range of 2 to 3.5.

11. A process according to any one of claims 1 to 10, wherein the temperature of the off-gases in the dry purifier is held below 150° C.

12. A process as described in claim 1, wherein the residence time of the off-gases in the mixing space of the evaporative cooler is held at from 3 to 7 seconds.

13. A process as described in claim 1, wherein the gas wash stage of the scrubber is formed by a wash tower having a layer of packing of hedgehog-type units and wherein the speed at which the off-gas flows through the layer of packing is kept above 1 m/second, based on the free cross-sectional area of said wash tower before the latter is filled with the packing.

14. A process as described in claim 1, wherein a wet-mechanical aerosol separator having a gas resistance of from 5 to 60 mbars is used in said scrubber.

15. A process as described in claim 15, wherein the gas resistance of the aerosol separator is from 10 to 30 mbars.

16. A process as described in claim 15, wherein a X-separator is used as the aerosol separator.

17. A process as described in claim 1, wherein the residence time of the off-gases in the mixing space of the evaporative cooler is at least 2 seconds.

18. A process as described in claim 1, wherein the off-gases to be purified are introduced at a temperature in the range from 150° to 400° C. into said mixing space of the evaporative cooler.

19. A process as described in claim 18, wherein the amount of the pollutants suspension continuously fed into the mixing space suffices to keep the temperature of the off-gases in the dry purifier below 170° C.

20. A process as described in claim 1, wherein the pH value of the wash liquid in the sludge separator and in each of the wash stages directly upstream of said sludge separator is kept below 2.

21. A process as described in claim 1, wherein, when the HCl and SO$_2$ contents of the off-gases to be purified are more than 2 g/Nm$^3$ of HCL+SO$_2$, the suspension of pollutants which is recycled from the sludge separator to the injection nozzle of the evaporative cooler is neutralised or even rendered somewhat alkaline before it enters into the latter, but only to such alkalinity that the pH value of the said suspension then becomes less than 4 again in the scrubber as a result of the content of acid pollutants in the off-gases entering the scrubber.

22. A process as described in claim 1, wherein the walls of the evaporative cooler and of the dry purifier which are in contact with the off-gasses are kept at a temperature which is the same as or above that which is reached adiabatically in the off-gas after the gas has been mixed thoroughly in said mixing space with the suspension of pollutants which is sprayed into said mixing space.

23. A process a described in claim 22, wherein the temperature of the walls of the said mixing space in the evaporative cooler which are in contact with the off-gas to be purified, and also the corresponding walls of the dry purifier are kept at more than 5 degrees Centigrade above the dew point of the acid in the mixture formed from the off-gas and the suspension of pollutants which is sprayed into said mixing space.

24. A process as described in claim 1, wherein more than 50% by volume of the circulating liquid, which flows through the first gas wash stage downstream of the dry purifier, is fed through a settling container of the sludge separator and the residence time of the liquid in the settling container of the sludge separator is kept, depending on the size of the latter, between 1 and 8 minutes.

25. A process as described in claim 24, wherein more than 70 and up to 100% by volume of the circulating liquid is fed through the settling container of the sludge separator and the residence time of the liquid in the settling container of the sludge separator is kept, depending on the size on the latter, between 3 and 5 minutes.

* * * * *

UNITED STATES PATENT AND TRADEMARK OFFICE
CERTIFICATE OF CORRECTION

PATENT NO. : 4,251,236
DATED : FEBRUARY 17, 1981
INVENTOR(S) : VOLKER FATTINGER ET AL

It is certified that error appears in the above-identified patent and that said Letters Patent are hereby corrected as shown below:

Claim 1, Column 16, line 18 reads:

"the gases and the suspension being separately removed"

should read:

-- the gases and the dry residue of said suspension being separately removed --

Signed and Sealed this

Ninth Day of February 1982

[SEAL]

Attest:

GERALD J. MOSSINGHOFF

Attesting Officer     Commissioner of Patents and Trademarks